United States Patent [19]
Sakamoto et al.

[11] Patent Number: 5,648,828
[45] Date of Patent: Jul. 15, 1997

[54] LIQUID CRYSTAL DISPLAY APPARATUS HAVING A PIXEL WITH AREAS OF DIFFERENT ORIENTATION IN WHICH A SPACER HAS A CYLINDRICAL PROFILE FOR ORIENTING

[75] Inventors: Michiaki Sakamoto; Tatsuo Onozawa, both of Tokyo, Japan

[73] Assignee: NEC Corporation, Japan

[21] Appl. No.: 510,199

[22] Filed: Aug. 2, 1995

[30] Foreign Application Priority Data

Aug. 4, 1994 [JP] Japan ................... 6-202844

[51] Int. Cl.⁶ ............... G02F 1/1333; G02F 1/1337; G02F 1/1339
[52] U.S. Cl. ............... 349/110; 349/129; 349/132; 349/155
[58] Field of Search ............... 359/76, 78, 81; 349/110, 129, 132, 155

[56] References Cited

U.S. PATENT DOCUMENTS

| | | | |
|---|---|---|---|
| 5,473,455 | 12/1995 | Koike et al. | 359/76 |
| 5,504,604 | 4/1996 | Takatori et al. | 359/78 |

FOREIGN PATENT DOCUMENTS

| | | | |
|---|---|---|---|
| 57-613 | 1/1982 | Japan | 359/81 |
| 3-69917 | 3/1991 | Japan | 359/81 |
| 4-177324 | 6/1992 | Japan | 359/81 |
| 5-224210 | 9/1993 | Japan . | |
| 5-232474 | 9/1993 | Japan . | |

OTHER PUBLICATIONS

S. Kaneko, et al., "*Invited Address: Wide–Viewing–Angle Improvements for AMLCDs*", SID '93 DIGEST, pp. 265–268, 1991.

*Primary Examiner*—William L. Sikes
*Assistant Examiner*—Walter J. Malinowski
*Attorney, Agent, or Firm*—Ostrolenk, Faber, Gerb & Soffen, LLP

[57] ABSTRACT

A TFT substrate and an opposed electrode substrate are disposed in an opposing relationship to each other with a spacer interposed therebetween for keeping the gap between the substrates fixed, and liquid crystal filling between the substrates. Orientation films on the substrates are oriented in different directions so that they divide the picture elements. A light intercepting film is provided on an orientation dividing line. The surface of the spacer is processed by orientation processing by which the liquid crystal is oriented perpendicularly to the surface of the spacer or in parallel to the substrates.

2 Claims, 6 Drawing Sheets

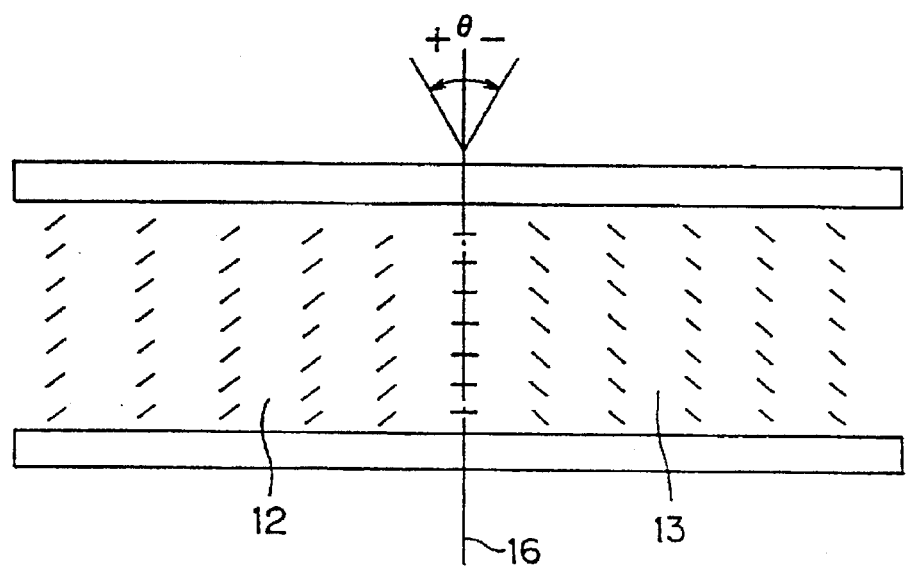
FIG. 1 (a) (prior art)
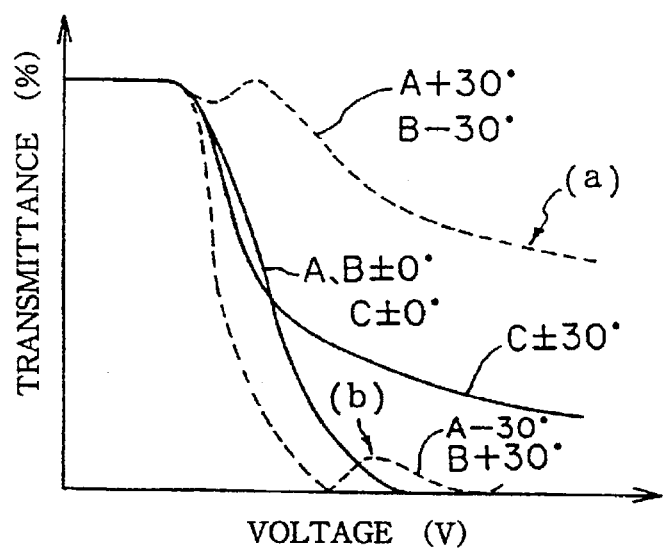
FIG. 1 (b) (prior art)

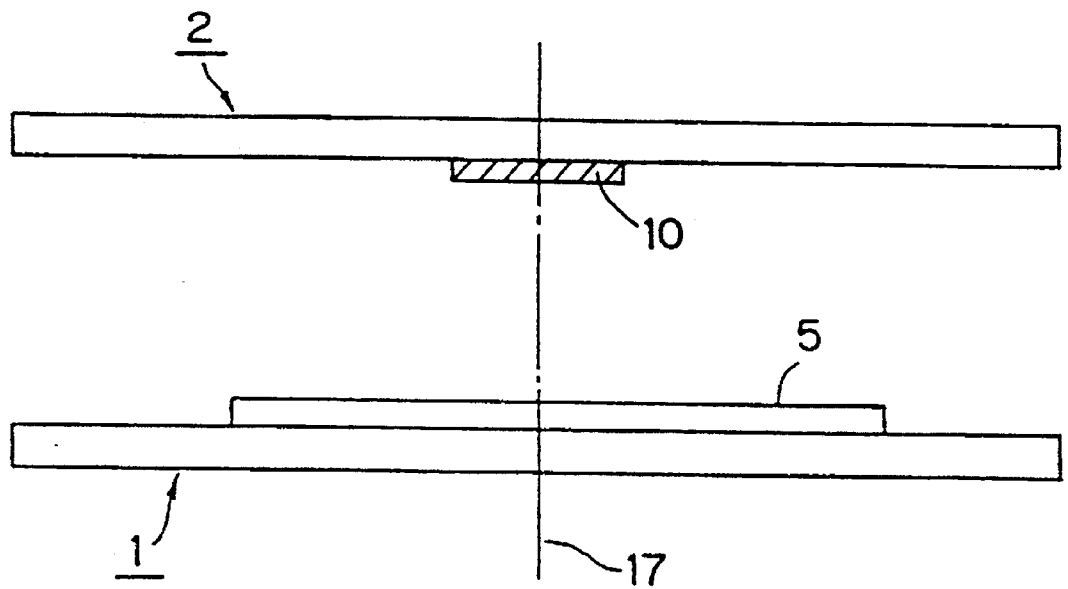
FIG. 2 (a) (prior art)
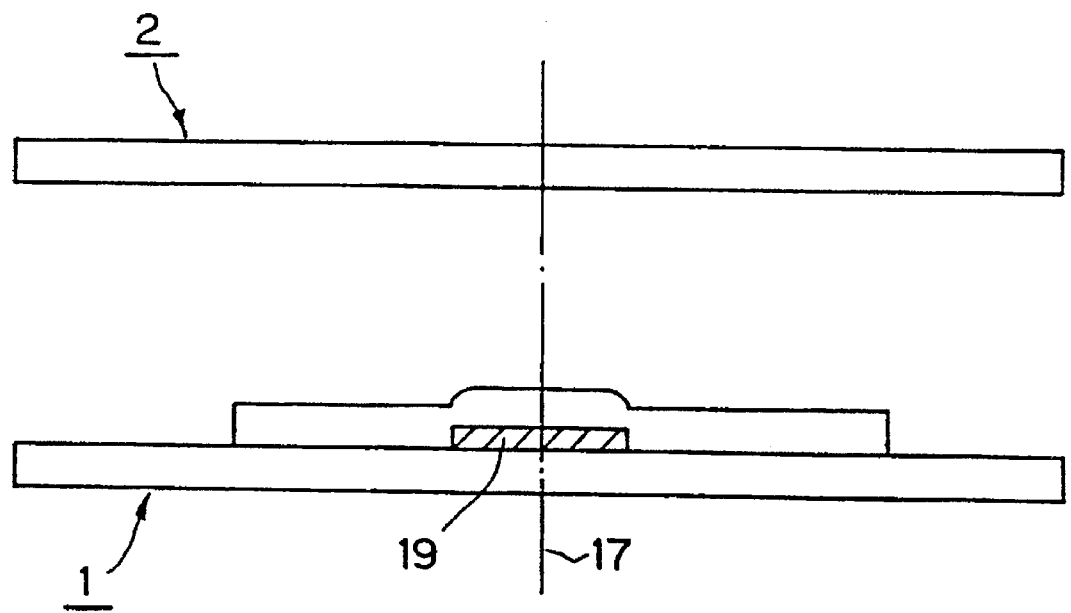
FIG. 2 (b) (prior art)

WHEN A VOLTAGE IS APPLIED

WHEN NO VOLTAGE IS APPLIED

DIRECTION OF LONGITUDE
WHEN A VOLTAGE IS APPLIED

DIRECTION OF LONGITUDE
WHEN NO VOLTAGE IS APPLIED

DIRECTION OF LATITUDE
WHEN A VOLTAGE IS APPLIED

DIRECTION OF LATITUDE
WHEN NO VOLTAGE IS APPLIED

LIQUID CRYSTAL DISPLAY APPARATUS HAVING A PIXEL WITH AREAS OF DIFFERENT ORIENTATION IN WHICH A SPACER HAS A CYLINDRICAL PROFILE FOR ORIENTING

BACKGROUND OF THE INVENTION

1. Field of the Invention

This invention relates to a liquid crystal display apparatus, and more particularly to a liquid crystal display apparatus in which twisted nematic liquid crystals having different orientation directions are provided in one picture element.

2. Description of the Prior Art

A liquid crystal display apparatus is employed in a broad field of OA equipments, television receivers, vehicle-carried equipments and so forth because of its characteristics of low power consumption, thinness, and lightness in weight. In the usual liquid crystal display panels employed at present, the upper and lower substrates constituting a panel are processed by orientation processing that gives the orientation direction of the liquid crystal filled between the substrates a predetermined tilt angle. A liquid crystal display panel of this type provides particularly narrow angles of visibility in the direction in which the liquid crystal is tilted and in the opposite direction, become of the asymmetry in orientation of the liquid crystal itself.

As a technique for canceling the asymmetry in orientation to assure a wide angle of visibility for a liquid crystal panel, an orientation dividing method has been proposed wherein, as shown in FIG. 1(a), a display picture element of a liquid crystal panel including TFT substrate 1 and opposed electrode substrate 2 between which liquid crystal is filled is processed by rubbing in different directions to divide it into two areas: normal tilt area 12 (hereinafter referred to as A) and reverse tilt area 13 (hereinafter referred to as B) which have different liquid crystal orientation directions (for example, SID '93 Digest, p.265).

A reason why the visibility angle characteristic of an orientation dividing panel formed based on the orientation dividing method described above is improved is described below.

FIG. 1(b) is a diagram showing voltage-transmission factor characteristics of liquid crystal having the orientation direction of A and liquid crystal having the orientation direction of B. In particular, shown in FIG. 1(b) are characteristics in three directions including characteristics (curves of A,B±0°) when the liquid crystal is viewed from the front, characteristics (curves of A+30° and B+30°) when the crystal is viewed from the direction of 30° above, characteristics (curves of A−30° and B−30°) when the crystal is viewed from the direction of 30° below, and characteristics (curves of C±0° and C±30°) of averages of the characteristics of the crystals in the individual directions. In FIG. 1(b), the curves of A,B±0° and C±0°, the curves of A+30° and B−30°, and the curves of A−30° and B+30° are the same respective curves.

As seen from FIG. 1(b), the liquid crystal which has the orientation direction of A exhibits, when viewed from above, a reduction in contrast caused by a dark luminance float in an area thereof denoted by arrow mark (a), but exhibits, when viewed from below, a gradation reversal in another area denoted by arrow mark (b), by which the visibility angle characteristic of the liquid crystal is degraded. Meanwhile, the other liquid crystal which has the orientation direction of B has a visibility angle characteristic opposite to that of the liquid crystal which has the orientation direction of A such that a gradation reversal occurs when the liquid crystal is viewed from above and a reduction in contrast occurs when the liquid crystal is viewed from below. For this reason, in a liquid crystal panel wherein a display picture element is divided into two areas of A and B whose visibility angle characteristics when viewed from above and below are opposite to each other, the visibility angle characteristic is given as such an average of the visibility angle characteristics of A and B as denoted at C in FIG. 1(b), and this improves the visibility angle characteristics of the liquid crystal panel when viewed from above and below.

As described above, in an orientation dividing panel, the visibility angle characteristics when viewed from above and below can be improved by dividing a display picture element into two areas of A and B whose visibility angle characteristics when viewed from above and below are opposite to each other. However, in the orientation dividing panel, a boundary line called disclination line (refer to FIG. 2(a)) caused by orientation division is produced in the proximity of a boundary between A and B having different liquid crystal orientation directions, and leakage of light occurs at the location of the disclination line. Consequently, the display quality of the panel is degraded in that the dark luminance becomes lighter to lower the contrast ratio.

Thus, various techniques for intercepting light through a disclination line described above have been proposed.

Japanese Patent Laid-Open Application No. Heisei 5-224210 discloses a technique wherein disclination line 17 is masked with light intercepting film 10 as seen in FIG. 2(a). According to the technique, light intercepting film 10 is provided on opposed electrode substrate 2 of a liquid crystal panel so that disclination line 17 produced by orientation division cannot be observed.

Meanwhile, Japanese Patent Laid-Open Application No. Heisei 5-232474 discloses another technique which makes use of a retention volume line for interception of light through a disclination line. According to the technique, as shown in FIG. 2(b), retention volume line 19 made of Cr or Al is provided in alignment with disclination line 17 on thin film transistor (TFT) substrate 1 of a liquid crystal panel in order to intercept light through disclination line 17. Here, the retention volume line denotes a wiring line for a capacitor added for improvement in voltage holding characteristic.

In the techniques disclosed in the publications mentioned above, however, if a spacer of a plastic material or the like provided to keep the panel gap fixed is located in the proximity of an orientation dividing line, the orientation direction of liquid crystal around the spacer is sometimes so disturbed by the influence of the spacer that the disclination line is displaced from the orientation dividing line on the picture element. Accordingly, the techniques have a problem in that, even if a light intercepting film or a retention volume line is provided for the orientation dividing line, leakage of light through the disclination line cannot be intercepted completely, and this degrades the display quality of the liquid crystal panel.

The displacement between the disclination line and the orientation dividing line by a spacer described above can be eliminated by applying orientation processing to the surface of the spacer so that the spacer may not disturb the orientation direction of the liquid crystal around the spacer. As a technique of applying such orientation processing to the surface of a spacer, a technique is disclosed in Japanese Patent Laid-Open Application No. Showa 57-613 wherein orientation processing is performed for the surface of a spacer to lower the surface energy of the spacer so that the spacer may not disturb the orientation direction of liquid crystal. Meanwhile, Japanese Patent Laid-Open Application No. Heisei 3-69917 discloses another technique wherein a spacer having a surface of a vertical orientation and another spacer having a surface of a horizontal orientation are employed simultaneously so as to reduce the disturbances in orientation by the spacers when a voltage is applied and when it is not applied.

However, the techniques disclosed in the publications just mentioned are directed to improvement in display characteristic of an ordinary liquid crystal panel whose orientation is not divided, and they exhibit little effect on suppression of the displacement between a disclination line and an orientation dividing line described above. In particular, in the technique disclosed in Japanese Patent Laid-Open Application No. Showa 57-613, the surface of a spacer in a liquid crystal panel, in which the surface of a substrate is processed so as to have a vertical orientation and the voltage application portion has a horizontal orientation, has a vertical orientation so as to prevent an irregular orientation, and consequently, the technique does not have an effect of preventing possible displacement of a disclination line for a TN or STN liquid crystal panel in which the voltage application portion has a vertical orientation. Therefore, the technique has a problem in that the displaying quality is still degraded. Meanwhile, in the technique disclosed in Japanese Patent Laid-Open Application No. Heisei 3-69917, as will be described below, a spacer is employed, but since the horizontal orientation processing moves the disclination line by a great amount a large amount of light leaks through the disclination line. Consequently, the technique also has a problem in that the displaying quality is still degraded.

SUMMARY OF THE INVENTION

It is the first object of the present invention to provide a liquid crystal display apparatus of the orientation dividing type wherein a picture element is divided into a plurality of areas having different orientation directions, thereby suppressing displacement between an orientation dividing line and a disclination line arising from the provision of a spacer.

It is a second object of the present invention to provide a liquid crystal display apparatus wherein, in addition to suppression of displacement between an orientation dividing line and a disclination line, leakage of light through the disclination line is intercepted completely to achieve improvement in displaying quality.

In order to attain the first object there is provided, according to the present invention, a liquid crystal display apparatus of the orientation dividing type which includes a plurality of picture elements each divided into a plurality of areas having different orientation directions of liquid crystal and wherein a pair of transparent substrates on which electrodes constituting the picture elements are formed are disposed in an opposing relationship to each other with a spacer interposed therebetween for keeping a gap between the transparent substrates fixed and the gap is filled with liquid crystal, wherein the surface of the spacer is processed by orientation processing by which the liquid crystal is oriented perpendicularly to the surface of the spacer or in parallel to the transparent substrates. In this instance, the spacer has a cylindrical profile, and the orientation processing is that of providing axial grooves on the cylindrical face of the spacer.

Further, in order to attain the second object the liquid crystal display apparatus described above is constructed such that a film having a light intercepting function is provided above or below a boundary line between the areas in which the orientation directions of the picture elements are different from each other.

The above and other objects, features, and advantages of the present invention will become aparent from the following description referring to the accompanying drawigns which illustrate an example of a preferred embodiment of the present invention.

With the liquid crystal display apparatus of the construction described above, by applying vertical orientation processing to the spacer or applying horizontal orientation processing parallel to the transparent substrates, disturbance in orientation direction of the liquid crystal around the spacer can be prevented, and displacement of the disclination line from the orientation dividing line arising from orientation division can be prevented. Consequently, even where the spacer is located in the proximity of the orientation dividing line, leakage of light through the disclination line can be intercepted completely by providing a film having a light intercepting function above or below a boundary line between areas of each picture element having different orientation directions.

In the following, influences on the orientation of liquid crystal when orientation processing is performed for the surface of a spacer of an orientation dividing panel are described in detail based on results of numerical calculations of orientations of liquid crystal separately for a case wherein vertical orientation processing is performed and another case wherein horizontal orientation processing is performed.

(1) Where vertical orientation processing is performed for the surface of a spacer:

FIGS. 5(a) and 5(b) are schematic views illustrating different manners of the orientation of liquid crystal in an orientation dividing liquid crystal panel wherein vertical orientation processing is performed for the surface of a spacer, and in particular, FIG. 5(a) illustrates a manner of the orientation of the liquid crystal when a voltage is applied and FIG. 5(b) illustrates a manner of the orientation of the liquid crystal when no voltage is applied.

When a voltage is applied, as shown in FIG. 5(a), in the proximity of the center between upper and lower substrates, the orientation direction of the liquid crystal undergoes a variation up to approximately 90° as the distance from the surface of spacer 14 increases due to the influence of the orientation processing of the surface of spacer 14, and consequently, the orientation distribution around spacer 14 is distorted. As a result of the distortion of the orientation distribution, disclination line 17 is displaced from orientation dividing line 16. For example, where the thickness of the gap of the liquid crystal panel is 5 µm and the applied voltage is 2.5 V, disclination line 17 is moved approximately 1 µm away from orientation dividing line 16.

When no voltage is applied, as seen in FIG. 5(b), no such sudden variation in orientation direction of the liquid crystal by an influence of the orientation processing of the surface of spacer 14 as described above occurs, and consequently, disclination line 17 and orientation dividing line 16 remain in alignment with each other.

(2) Where horizontal orientation processing is performed for the surface of a spacer:

FIGS. 6(a) to 6(d) are schematic views illustrating different manners of the orientation of liquid crystal in another orientation dividing liquid crystal panel wherein horizontal orientation processing is performed for the surface of a spacer, and particularly, FIG. 6(a) illustrates a manner of the orientation of the liquid crystal in the direction of the longitude when a voltage is applied, FIG. 6(b) illustrates a manner of the orientation of the liquid crystal in the direction of the longitude when no voltage is applied, FIG. 6(c) illustrates a manner of the orientation of the liquid crystal in the direction of the latitude when a voltage is applied, and FIG. 6(d) illustrates a manner of the orientation of the liquid crystal in the direction of the latitude when no voltage is applied.

First, description is given of the cases wherein the orientation processing is performed in parallel to a line of the latitude or perpendicularly to an axial line of the spacer.

When a voltage is applied, as shown in FIG. 6(a), orientation direction 18 of the liquid crystal at a right upper portion of the surface of spacer 14 is parallel to the orientation of the liquid crystal in reverse tilt area 13, and consequently, the orientation direction of the liquid crystal in the proximity of orientation dividing line 16 of normal tilt area 12 is varied to the orientation of reverse tilt area 13. Consequently, the area of the orientation of reverse tilt area 13 is expanded, and as a result, disclination line 17 is displaced from orientation dividing line 16. For example, where the thickness of the gap of the liquid crystal panel is 5 μm and the applied voltage is 2.5 V, disclination line 17 is displaced approximately 7 μmm from orientation dividing line 16 toward the spacer. It is to be noted that, since the orientation of the liquid crystal at a right lower portion of the surface of spacer 14 is coincident with the orientation of the liquid crystal in normal tilt area 12, it does not act to move the disclination line, and consequently, the displacement of the disclination line is dominated after all by the orientation at the right upper portion of the spacer.

When no voltage is applied, orientation direction 18 of the liquid crystal at the surface of spacer 14 is varied suddenly as seen in FIG. 6(b). However, no influence is had on the orientation direction of the liquid crystal in any of normal tilt area 12 and reverse tilt area 13, and disclination line 17 and orientation dividing line 16 remain in alignment with each other.

Next, description is given of the cases wherein the orientation processing is performed in parallel to a line of the latitude or the axial line of the spacer.

When a voltage is applied, as seen in FIG. 6(c), the orientation of the liquid crystal in any of normal tilt area 12 and reverse tilt area 13 is not influenced by the surface of the spacer at all. Consequently, disclination line 17 remains in alignment with orientation dividing line 16.

Also when no voltage is applied, as seen in FIG. 6(d), the orientation of the liquid crystal in any of normal tilt area 12 and reverse tilt area 13 is not influenced by the surface of the spacer at all, and disclination line 17 remains in alignment with orientation dividing line 16.

From the description above, the following conclusions can be obtained.

(1) Where vertical orientation processing is performed for the surface of spacer 14, although disclination line 17 is displaced from orientation dividing line 16, the amount of the displacement is small (approximately 1 μm). Accordingly, leakage of light through the disclination line can be intercepted completely by means of a light intercepting film of, for example, approximately 10 μm wide (for example, a film disclosed in Japanese Patent Laid-Open Application No. Heisei 5- 232474 or No. Heisei 5-224210).

(2) Where horizontal orientation processing is performed for the surface of spacer 14 such that the liquid crystal is oriented, on the surface of the spacer, in parallel to the direction of a line of longitude of the spacer (where the spacer has a spherical profile) or oriented perpendicularly to the axial line of the spacer (where the space has a cylindrical profile), disclination line 17 is displaced by a great distance from orientation dividing line 16. On the other hand, where horizontal orientation processing is performed such that the liquid crystal is oriented, on the surface of the spacer, in parallel to a line of latitude of the spacer (where the spacer has a spherical profile) or oriented in parallel to the axial line (where the spacer has a cylindrical profile), the disclination line is substantially in alignment with the orientation dividing line. Consequently, when horizontal orientation processing is performed for the surface of the spacer, the disclination line can be put substantially into alignment with the orientation dividing line by applying orientation processing so that the liquid crystal is oriented in parallel to the planes of the substrates. Consequently, leakage of light through the disclination line can be intercepted completely, similarly as described above.

As described above, in the liquid crystal display apparatus of the orientation dividing type of the present invention, since displacement of the disclination line caused by orientation division can be suppressed by applying orientation processing to the surface of the spacer so that liquid crystal is oriented on the surface of the spacer perpendicular to the surface of the spacer or oriented in parallel to the planes of the substrates, interception of light through the disclination lie can be achieved with certainty. Consequently, the liquid crystal display apparatus is advantageous in that it has an improved display quality.

BRIEF DESCRIPTION OF THE DRAWINGS

FIG. 1(a) is a sectional view of a liquid crystal display apparatus of the orientation dividing type and FIG. 1(b) is a diagram illustrating voltage-luminance characteristics of the liquid crystal display apparatus of the orientation dividing type shown in FIG. 1(a);

FIG. 2(a) is a sectional view showing a general construction of a liquid crystal display apparatus disclosed in Japanese Patent Laid-Open Application No. Heisei 5-224210 and FIG. 2(b) is a sectional view showing a general construction of a liquid crystal display apparatus disclosed in Japanese Patent Laid-Open Application No. Heisei 5-232474;

DESCRIPTION OF THE PREFERRED EMBODIMENTS

In the following, embodiments of the present invention are described with reference to the drawings.

Figure 3:
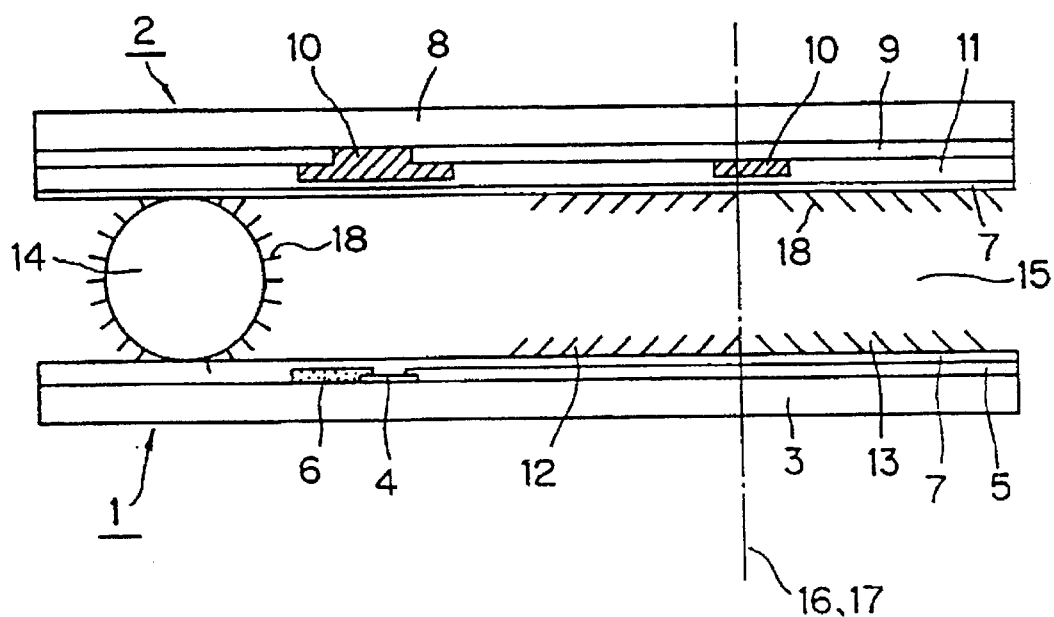
FIG. 3 is a sectional view showing a general construction of a liquid crystal display apparatus of a first embodiment of the present invention.

FIG. 3 is a sectional view showing a general construction of a liquid crystal display apparatus of a first embodiment of the present invention. As shown in FIG. 3, the liquid crystal display apparatus is constructed such that TFT substrate 1 and opposed electrode substrate 2 are disposed in an opposing relationship to each other with spacer 14 interposed therebetween for keeping the gap between TFT substrate 1 and opposed electrode substrate 2 fixed, and liquid crystal 15 is filled in the gap between the two substrates.

TFT substrate 1 includes glass substrate 3 on the surface of which is provided thin film transistor (TFT) 4 formed from amorphous silicon or a like material, display picture element electrode 5 formed from ITO or a like material, scanning line 6 formed from a metal material such as Cr or Al and some other elements; and upon those members on the surface of substrate 3 orientation film 7, made of polyimide or a like material, is provided. Display picture element electrode 5 is divided into two areas having different tilt angles, that is, normal tilt area 12 and reverse tilt area 13, and thus has a panel construction of the orientation dividing type. Orientation film 7 is processed by orientation processing so that it has different tilt angles between normal tilt area 12 and reverse tilt area 13 thereof.

Opposed electrode substrate 2 includes glass substrate 8, on which color filter 9, light intercepting film 10 made of Cr or a like material and opposed electrode 11 made of ITO or a like material are provided, and orientation film 7, made of polyimide or a like material, is provided on the members on glass substrate 8. Light intercepting film 10 is formed in such a manner as to cover over a portion on TFT substrate 1 corresponding to the boundary between normal tilt area 12 and reverse tilt area 13.

Light intercepting film 10 is a film formed integrally with an ordinary black matrix for intercepting light through the boundary between orientation dividing areas provided on color filter 9. It is to be noted that interception of light at the boundary between orientation divided areas may be realized by a retention volume line, a gate wiring line or a drain wiring line provided on TFT substrate 1 side. Also orientation film 7 of opposed electrode substrate 2 side is processed by orientation processing by which normal tilt area 12 and reverse tilt area 13 are provided with different tilt angles in accordance with the orientation direction of orientation film 7 on TFT substrate 1 side.

For spacer 14, a plastic ball (for example, Micropearl by Sekisui Chemical Co., Ltd.) of approximately 5 μm in diameter may be used. The surface of the plastic ball is processed by orientation processing in a perpendicular direction using a surface processing agent of the organic silane type (N,N-dimethyl-N-octadecyl-3-aminopropyltrimethoxysilyl-chloride or the like) such as, for example, FC-805 (by Sumitomo 3M).

In the liquid crystal display apparatus of the present embodiment constructed in such a manner as described above, since vertical orientation processing is performed for the surface of spacer 14, even if spacer 14 is located in the proximity of the display picture element, disclination line 17 is not displaced by a great amount from orientation dividing line 16. Accordingly, leakage of light through disclination line 17 is intercepted completely by light intercepting film 10 provided on opposed electrode substrate 2 side. Since leakage of light through disclination line 17 can be intercepted completely in this manner, a superior displaying characteristic having a wide angle of visibility free from reduction in contrast arising from disclination can be obtained.

Another embodiment is described below.

Figure 4:
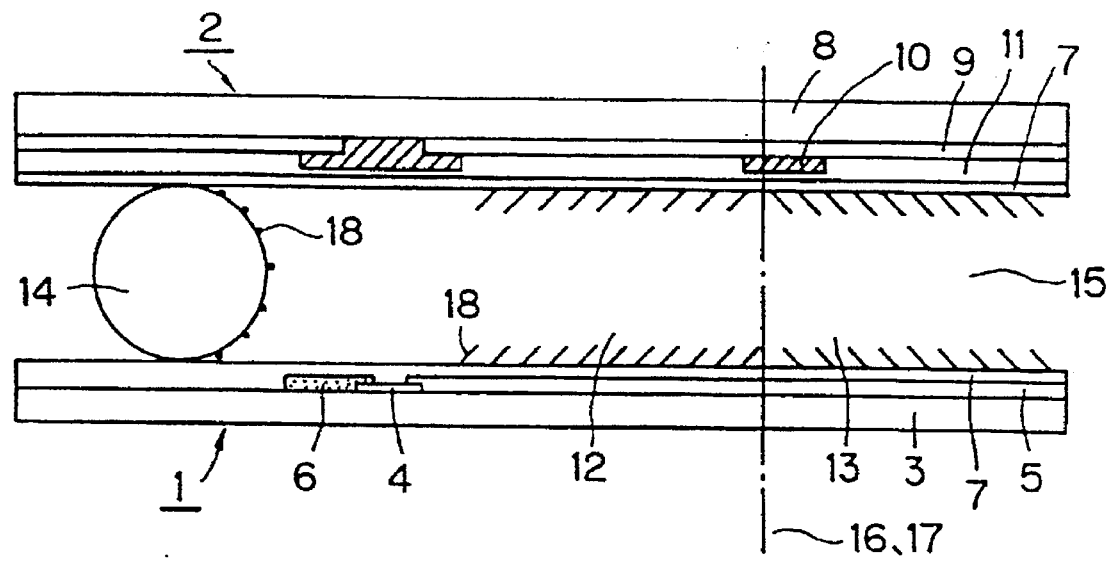
FIG. 4(a) is a sectional view showing a general construction of a liquid crystal display apparatus of a second embodiment of the present invention and FIG. 4(b) is a perspective view of a spacer shown in FIG. 4(a)
Figure 4:
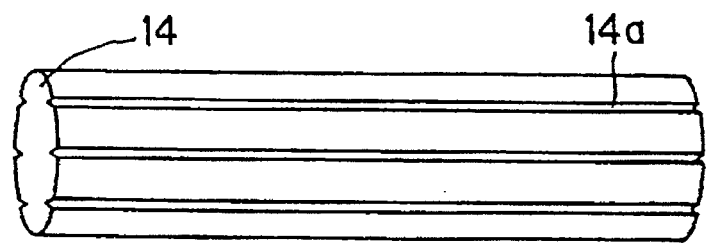
Figure 5:
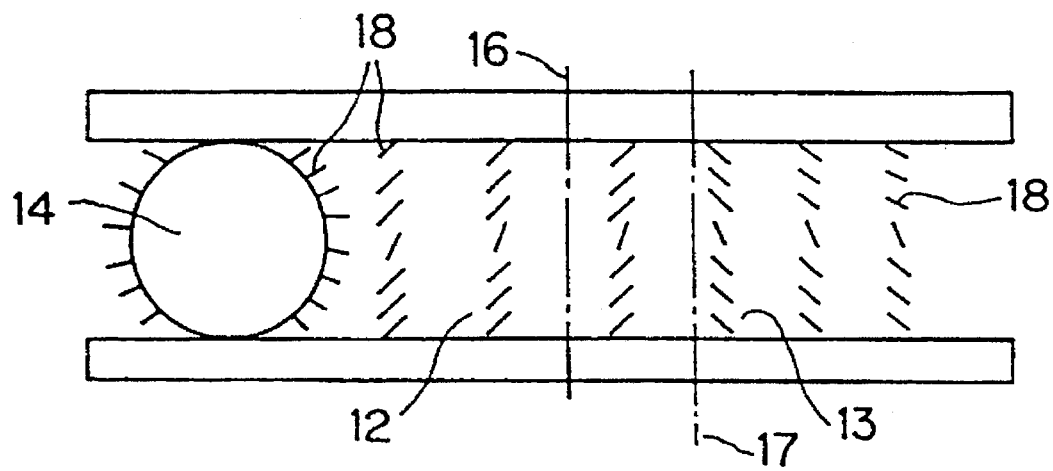
FIGS. 5(a) and 5(b) are schematic views illustrating an influence on the orientation of liquid crystal where vertical orientation processing is applied to the surface of a spacer, and FIG. 5(a) illustrating a manner of the orientation of the liquid crystal when a voltage is applied and FIG. 5(b) illustrating a manner of the orientation of the liquid crystal when no voltage is applied.
Figure 5:
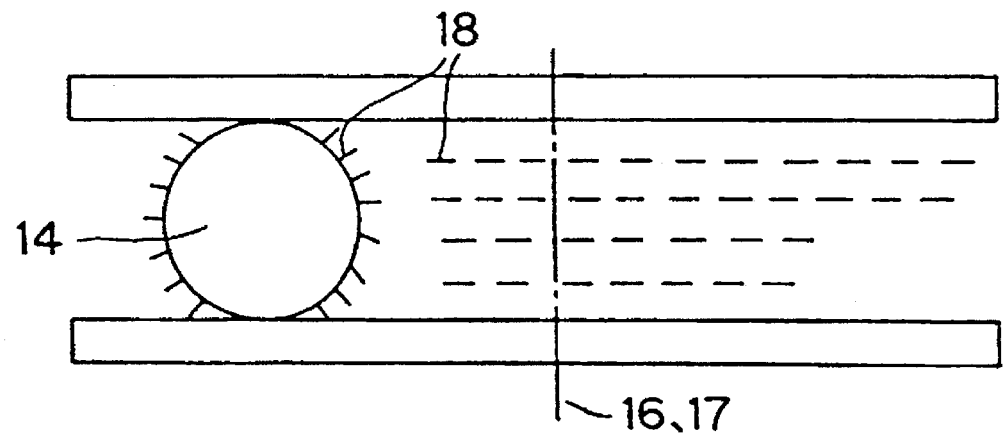
Figure 6:
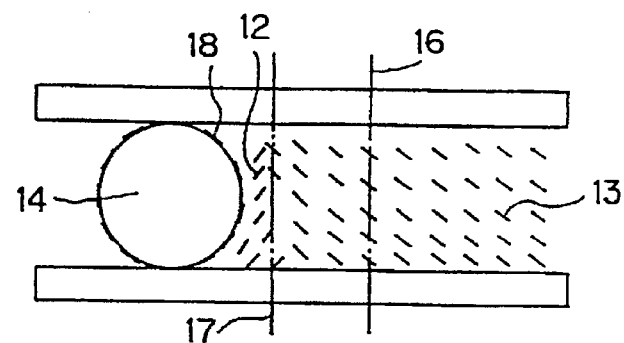
FIGS. 6(a) to 6(d) are schematic views illustrating an influence on the orientation of liquid crystal where horizontal orientation processing is performed for the surface of a spacer, FIG. 6(a) illustrating a manner of the orientation of the liquid crystal in the direction of longitude when a voltage is applied, FIG. 6(b) illustrating a manner of the orientation of the liquid crystal in the direction of longitude when no voltage is applied, FIG. 6(c) illustrating a manner of the orientation of the liquid crystal in the direction of latitude when a voltage is applied, and FIG. 6(d) illustrating a manner of the orientation of the liquid crystal in the direction of latitude when no voltage is applied.
Figure 6:
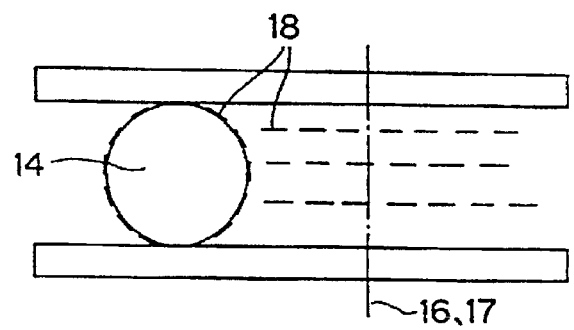
Figure 6:
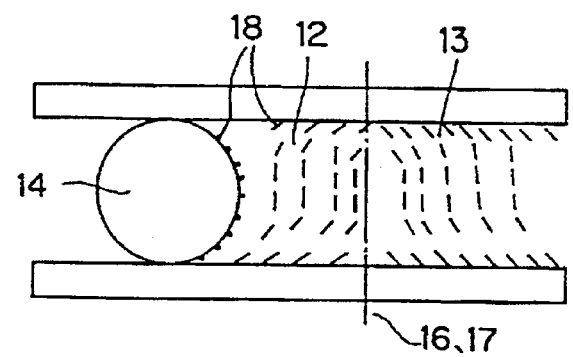
Figure 6:
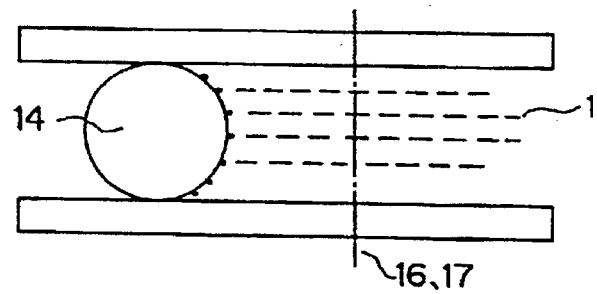

FIG. 4(a) is a sectional view showing a general construction of a liquid crystal display apparatus of the second embodiment of the present invention. In FIG. 4(a), a manner of the orientation of liquid crystal is schematically shown. Since the liquid crystal display apparatus of the present invention is similar to the construction of the liquid crystal display apparatus of the first embodiment described above except spacer 14, overlapping description is omitted.

In the liquid crystal display apparatus of the present embodiment, a spacer of a cylindrical profile having a plurality of grooves 14a formed on its surface in parallel to an axial line as shown in FIG. 4(b) is used as spacer 14. Consequently, as seen from FIG. 4(a), orientation direction 18 of the liquid crystal on the surface of spacer 14 is parallel to the axial line of the spacer, and disclination line 17 is prevented from being displaced from orientation dividing line 16. Consequently, similarly to the liquid crystal display apparatus of the first embodiment described above, leakage of light through the disclination line can be intercepted completely by light intercepting film 10 provided on opposed electrode substrate 2 side.

What is claimed is:

1. A liquid crystal display apparatus of the orientation dividing type, comprising:

a plurality of picture elements each divided into a plurality of areas having different orientation directions of liquid crystal and wherein a pair of transparent substrates, on which electrodes constituting the picture elements are formed, are disposed in an opposing relationship to each other with a spacer interposed therebetween for keeping a gap between said transparent substrates fixed and liquid crystal filling the gap, the surface of said spacer is processed by orientation processing by which said liquid crystal is oriented perpendicularly to the surface of said spacer or in parallel to said transparent substrates, said spacer has a cylindrical profile, and the orientation processing is a process of providing axial grooves on a cylindrical face of said spacer.

2. A liquid crystal display apparatus as claimed in claim 1, wherein a film having a light intercepting function is provided above or below a boundary line between the areas in which the orientation directions of the picture elements are different from each other.

* * * * *